United States Patent Office 3,574,028
Patented Apr. 6, 1971

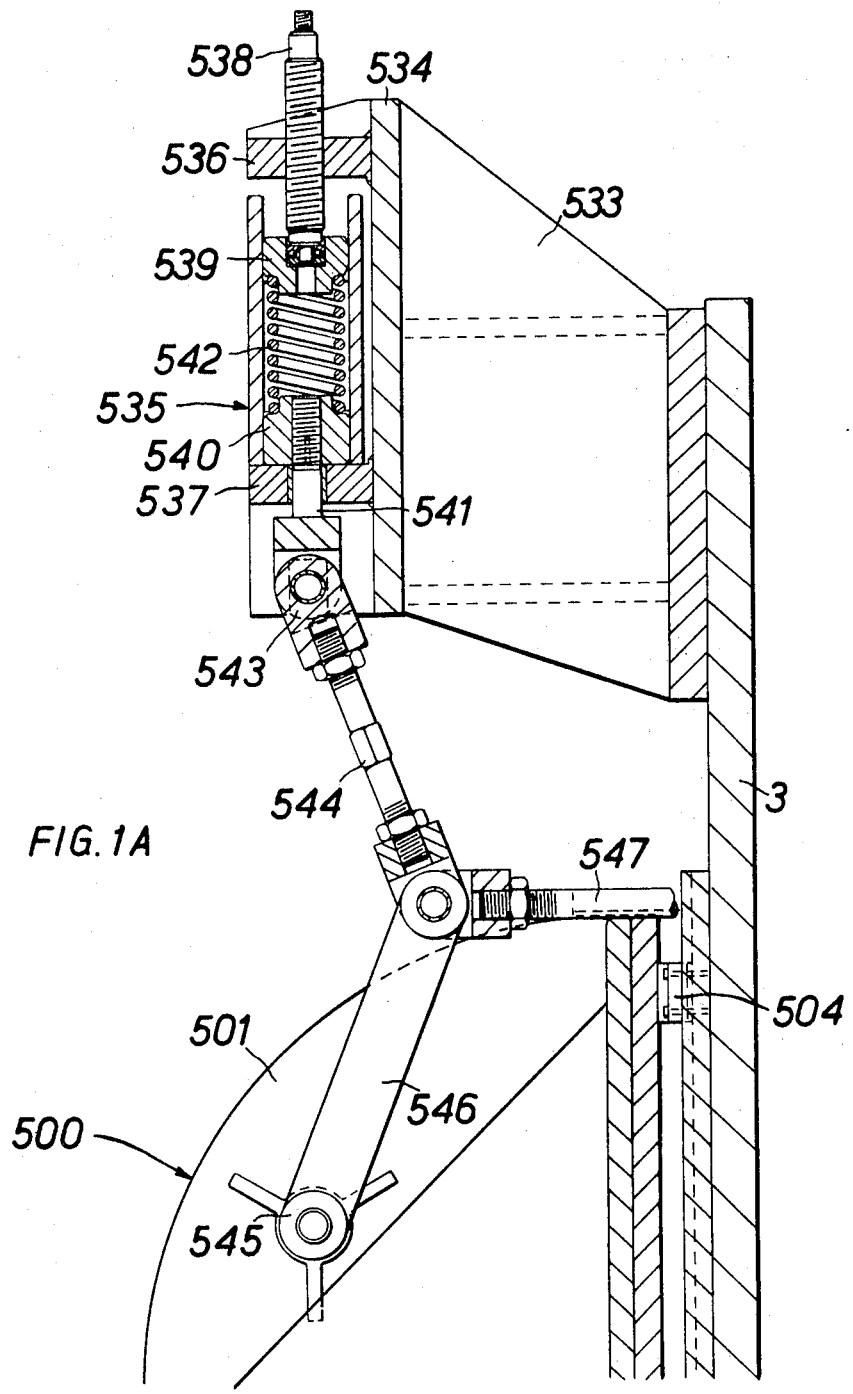

3,574,028
METHOD FOR THE ALIGNMENT OF PARTS OF ARTICLES
Norman Ashcroft Hurst, Four Oaks, Thomas Edward Horace Gray, Sutton Coldfield, and James Jones-Hinton, Tanworth-in-Arden, England, assignors to Dunlop Rubber Company Limited, London County, England
Filed Dec. 14, 1966, Ser. No. 601,625
Claims priority, application Great Britain, Dec. 15, 1965, 53,344/65
Int. Cl. B29c 27/04
U.S. Cl. 156—228       3 Claims

ABSTRACT OF THE DISCLOSURE

A method for accurately relatively aligning parts of articles from an initially substantially aligned position utilising accurately relatively positioned locating means for each of the parts, and separating the locating means carrying the parts to allow relative movement to take place between the locating means and the parts, in the separated position, resulting in accurate alignment of parts and locating means.

---

This invention relates to a method for the alignment of parts of articles.

In the manufacture of articles formed of two or more parts it is necessary for the parts to be located adjacent one another in substantially the relative positions that they occupy in the finished article before they are clamped together and subjected to a joining operation.

It is an object of the present invention to ensure that prior to the joining operation the parts of the article are in accurate alignment one with another.

According to the invention a method of aligning the parts of articles comprises initially locating the parts together in substantially the relative positions they occupy in the finished article, moving accurately relatively positioned locating means for each of the parts into engagement with the parts maintaining each part in engagement with its locating means, relatively moving the locating means away from each other to separate the parts of the article and allow individual alignment of each article part with its locating means, and relatively moving the locating means towards each other to clamp the parts together in accurate relative alignment.

Preferably each locating means is moved into engagement with at least part of the outer surface of its associated part.

According to the invention also apparatus for aligning parts of articles comprises locating means for each part of the article, means for maintaining each part of the article in engagement with its locating means, and means for moving the locating means towards and away from each other and into clamping contact with article parts mounted therebetween.

Figure 1B:
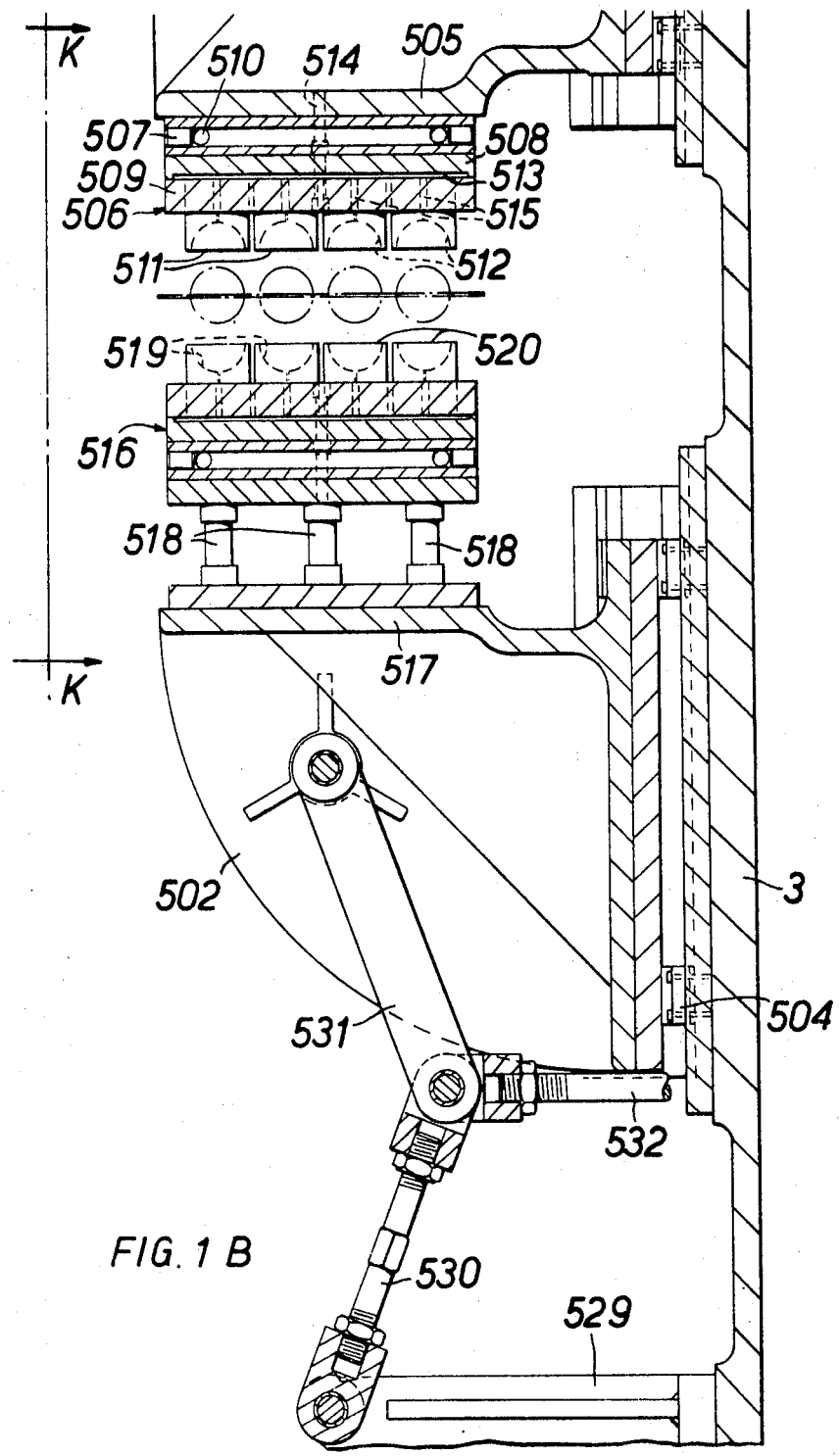
Figure 2:
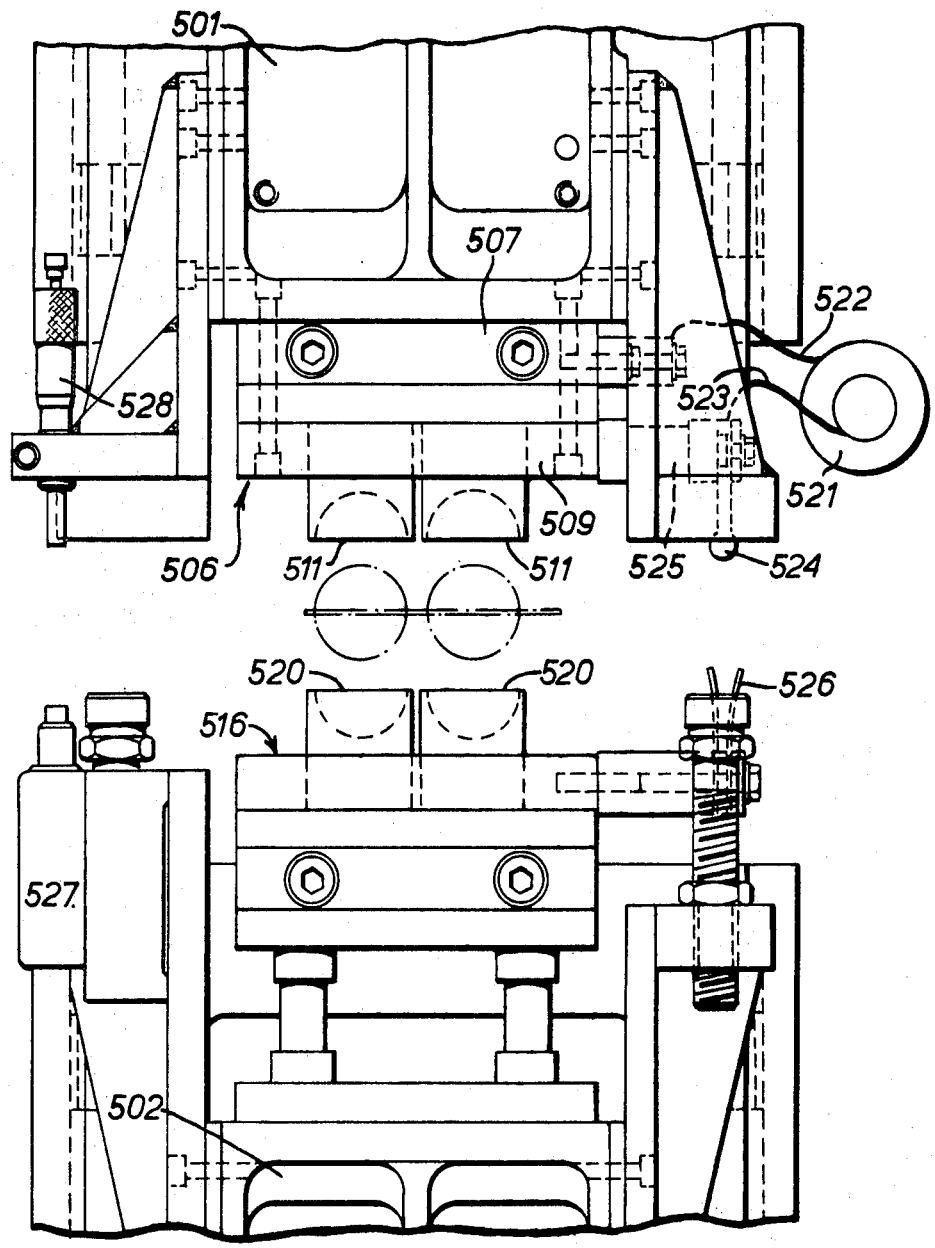

One embodiment of the invention will now be described, by way of example, with reference to the accompanying drawings in which:

FIGS. 1a and 1b are a sectional view in side elevation of apparatus according to the invention and FIG. 2 is a view on line KK of FIG. 1.

The apparatus 500 of this invention is for the manufacture of table tennis balls and comprises welding apparatus for forming two sheets of plastic material each with eight hemispheres formed therein into a sheet of double the thickness of the original sheet and containing eight spheres by High Frequency welding. Apparatus of this kind for forming hollow plastic articles is described in the specification of U.S. Pat. No. 3,411,971. The apparatus described in this embodiment forms part of a table tennis ball making machine as described in our copending patent application No. 601,592, now abandoned.

More particularly the apparatus 500 comprises upper 501 and lower 502 right-angle swan neck main brackets slidably mounted on a frame 3 in re-circulating roller bearings 504 which are shake-free.

Secured to the lower end 505 of the upper bracket i.e. that end remote from the frame, is an upper electrode mounting assembly 506 which comprises a temperature control plate 507 secured to the bracket, a spacer plate 508 secured to the control plate, and an electrode holding plate 509 secured to the spacer plate. The temperature control plate 507 has a bore 510 formed therein for the pasage of heating or cooling fluid to maintain the temperature of the electrode holding plate 509 substantially constant. The electrode holding plate 509 has eight circular bores extending therethrough in each of which is located a cylindrical electrode 511. The lower face 512 of each electrode is hemispherically recessed, the sphere of which it forms a part having a diameter equal to the diameter of the finished table tennis ball. Each electrode forms an accurately positioned locating means and welding jig for a part of a ball.

The spacer plate 508 has a recess 513 formed in its lower surface so that when the plates are assembled a chamber is formed between the spacer and holding plates. A passageway 514 is formed through the bracket, and control and spacer plates, for connecting the chamber so formed to a source of vacuum. Further passageways 515 through each of the electrodes connect the chamber with the hemispherical surfaces 512 of the electrodes 511. Thus means are provided for drawing the hemispheres into engagement with the electrodes.

A lower electrode mounting assembly 516 of identical construction to the upper electrode mounting assembly described above is mounted on the end 517 of the lower bracket 502 by means of six ceramic spacer rods 518 so that the hemispherical surfaces 519 of the lower electrodes 520 are directly opposed to the hemispherical surfaces 512 of the upper electrodes 511.

A High Frequency energy source 521 is mounted on the frame 3 adjacent the upper assembly 506. A first flexible lead 522 is connected between the temperature control plate 507 and the earth return of the source and a second flexible lead 523 is connected between the output of the H.F. source and the first part 524 of an electrical connector mounted by means of an insulator 525 on the upper electrode holding plate 509. The second part 526 of the connector is mounted on and electrically connected to the electrode holding plate of the lower assembly 516. A switch 527 for turning off the H.F. current is mounted on the lower bracket 502 and is operable by an adjustable contactor 528 mounted on the upper bracket 501.

A further bracket 529 is fixed to the central leg 3 of the frame below the slideway for the lower bracket 502. The lower link 530 and the upper link 531 of a toggle mechanism are pivotally secured at one end of each respectively to the further bracket 529 and to the lower bracket 502. The other ends of the links and one end of a push rod 532 for the toggle mechanism are pinned together. Movement of the push rod therefore causes the lower bracket to move up and down with respect to its slideway on the frame.

Another bracket 533 is bolted to the frame 3 above the slideway of the upper bracket 501. Extending from the end 534 of the bracket remote from the frame is a spring-loaded device 535 forming means for moving the electrodes into clamping contact with each other during welding. The device comprises upper 536 and lower 537 parallel members. The upper member 536 is provided with an adjusting screw 538 which passes through the upper member 536 in screw-threaded engagement therewith. On the lower end of the adjusting screw 538 is rotatably mounted a spring-seating member 539. A second spring seating member 540 is attached to a plunger 541 which extends from the seating member 540 through the lower member 537. A compression spring 542 is located between the two spring seating members. Rotation of the adjusting screw 538 alters the pre-loading of the spring 542.

The upper end 543 of one link 544 of a second toggle mechanism is pivotally attached to the plunger 541 and the lower end 545 of the second link 546 of the toggle mechanism is pivotally attached to the upper bracket 501. The other ends of the links 544 and 546 are pivotally connected with one end of a push rod 547. Movement of the push rod 547 therefore moves the upper bracket 501 up and down, but if the upper bracket is prevented from moving down, the push rod is still able to move as the spring 542 compresses. Then if with the push rod 547 stationary and the spring 542 compressed the upper bracket 501 does become free to move the spring will urge the upper bracket downwards towards the lower bracket.

The push rods 547 and 532 respectively actuating the upper bracket 501 and lower bracket 502 are connected to cam followers (not shown) which follow welding bracket actuating cams (also not shown). The profiles of these cams are such that during rotation of the cams the brackets are moved towards each other until the electrodes 511 and 520 are in contact with the sheet, relatively away from each other slightly, and then relatively towards each other again into clamping engagement with the sheet and to compress the spring 542.

The operation performed in the welding station serves to join the two halves of the sheet, each with eight hemispheres formed therein, to form eight spheres in a double thickness web of the sheet material. A doubled sheet of the material (shown in chain dotted lines) is located in the welding station when the brackets 501 and 502 are spaced apart. The welding bracket actuating cams rotate to actuate the toggle mechanisms to move the brackets 501 and 502 towards each other. This movement continues until the electrodes 511 and 520 just contact the sheet. The passageways 515 leading to the hemispherical surfaces 512 and 519 of the electrodes are then connected to a source of vacuum and the upper and lower halves of the sheet are drawn respectively into intimate contact with the upper and lower electrodes. Further rotation of the cams and consequent operation of the toggle mechanism moves the brackets away from each other to separate the upper and lower halves of the sheet and allow individual alignment of each hemisphere with its electrode to ensure that the hemispheres in each half are accurately and securely seated in the electrodes. Since the brackets are mounted in shake-free slideways 504 the two halves of each sphere will be in alignment.

Continued rotation of the cam moves the brackets towards each other to bring the electrodes and sheet into clamping engagement and to compress the spring 542. At the same time the two parts 524 and 526 of the electrical connector mounted on the upper 506 and lower 516 electrode mounting assemblies come into contact to complete the H.F. circuit. A switch is operated by a cam to switch on the H.F. current. Welding of the spheres then takes place about the periphery of the sphere at the junction of the two sheets.

As welding takes place the material softens and flows and the upper bracket 501 is urged towards the lower bracket 502 by the spring 542. When sufficient flow of the material has occurred the contactor 528 on the upper assembly operates the "off" switch 527 on the lower assembly to switch off the H.F. current.

During welding the electrodes 511 and 520 are kept at a substantially constant temperature somewhat above room temperature by passing heating or cooling fluid as required through the temperature control plates 507.

When welding is complete the vacuum source is shut off, and the brackets moved away from each other to release the sheet.

Thus the two pre-formed sheets are accurately welded together to form a single sheet incorporating accurately welded spheres.

Having now described our invention, what we claim is:

1. A method of accurately aligning pre-formed table-tennis ball halves which comprises the steps of initially locating the ball halves together in substantially the positions they occupy in the finished ball, engaging the ball halves in respective welding jigs by moving the welding jigs in engagement with the ball halves, the welding jigs having cavities for engagement with the ball halves, drawing each ball half into engagement with its cavity by application of vacuum in said cavity, relatively moving the welding jigs away from each other while continuing to draw by vacuum each ball half into engagements with its cavity, whereby the ball halves are separated and each ball half moves into final alignment with its cavity, and relatively moving the welding jigs towards each other to clamp the ball halves together in accurate relative alignment and welding the ball halves together while thus aligned.

2. A method according to claim 1 in which the cavities are hemispherical cavities.

3. A method according to claim 1 wherein the welding jigs are electrodes of a high frequency welding apparatus.

References Cited
UNITED STATES PATENTS

| | | | |
|---|---|---|---|
| 1,146,523 | 7/1915 | Roberts | 156—228X |
| 1,531,505 | 3/1925 | Roberts | 156—228X |
| 2,322,140 | 6/1943 | Kalowski | 156—228X |
| 3,411,974 | 11/1968 | Jones-Hilton et al. | 128—228X |
| 2,253,291 | 8/1941 | Franknol | 156—196 |
| 2,513,052 | 6/1950 | Roberts. | |

REUBEN EPSTEIN, Primary Examiner

U.S. Cl. X.R.
156—273, 285, 380